(12) United States Patent
Gasparini

(10) Patent No.: US 11,558,201 B2
(45) Date of Patent: *Jan. 17, 2023

(54) SELF-AUTHENTICATING DIGITAL IDENTITY

(71) Applicant: Banco Bilbao Vizcaya Argentaría, S.A., Madrid (ES)

(72) Inventor: Louis Gasparini, San Mateo, CA (US)

(73) Assignee: Banco Bilbao Vizcaya Argentaria, S.A., Madrid (ES)

( * ) Notice: Subject to any disclaimer, the term of this patent is extended or adjusted under 35 U.S.C. 154(b) by 29 days.

This patent is subject to a terminal disclaimer.

(21) Appl. No.: 17/313,739

(22) Filed: May 6, 2021

(65) Prior Publication Data

US 2021/0258170 A1     Aug. 19, 2021

Related U.S. Application Data

(63) Continuation of application No. 15/908,554, filed on Feb. 28, 2018, now Pat. No. 11,025,436.

(60) Provisional application No. 62/465,431, filed on Mar. 1, 2017.

(51) Int. Cl.
*H04L 9/32* (2006.01)
*H04L 9/14* (2006.01)
*H04L 9/30* (2006.01)

(52) U.S. Cl.
CPC ............. *H04L 9/3255* (2013.01); *H04L 9/14* (2013.01); *H04L 9/30* (2013.01); *H04L 9/3242* (2013.01); *H04L 9/3271* (2013.01)

(58) Field of Classification Search
CPC . H04L 9/3255; H04L 9/14; H04L 9/30; H04L 9/3242; H04L 9/3271
See application file for complete search history.

(56) References Cited

U.S. PATENT DOCUMENTS

| | | | | |
|---|---|---|---|---|
| 6,615,347 | B1* | 9/2003 | de Silva | H04L 9/3263 713/157 |
| 2004/0186906 | A1* | 9/2004 | Torrant | H04L 47/70 709/228 |
| 2010/0185864 | A1* | 7/2010 | Gerdes, Jr. | H04L 9/3213 713/176 |
| 2011/0031310 | A1* | 2/2011 | Wilson | G06Q 20/12 235/380 |
| 2011/0078439 | A1* | 3/2011 | Mao | H04W 12/06 713/156 |
| 2012/0014507 | A1* | 1/2012 | Wu | A61N 5/10 378/65 |
| 2012/0102332 | A1* | 4/2012 | Mullin | H04W 12/065 713/186 |
| 2013/0197946 | A1* | 8/2013 | Hurry | G06Q 50/22 705/4 |
| 2015/0095999 | A1* | 4/2015 | Toth | H04L 9/3263 726/6 |
| 2016/0246617 | A1* | 8/2016 | Watsen | H04L 63/0823 |
| 2016/0294845 | A1* | 10/2016 | Jackson | H04L 63/123 |

(Continued)

OTHER PUBLICATIONS

Notice of Allowance received in U.S. Appl. No. 15/908,554 dated Feb. 5, 2021.

*Primary Examiner* — Darshan I Dhruv
(74) *Attorney, Agent, or Firm* — ALG Intellectual Property, LLC

(57) ABSTRACT

A method of creating and applying a self-authenticating digital identity for a user having an identity is described.

9 Claims, 3 Drawing Sheets

(56) References Cited

U.S. PATENT DOCUMENTS

| | | | |
|---|---|---|---|
| 2016/0373260 A1* | 12/2016 | Jerkeby | H04L 9/30 |
| 2016/0380774 A1* | 12/2016 | Lovelock | H04L 9/3247 |
| | | | 713/169 |
| 2017/0111170 A1* | 4/2017 | Baghdasaryan | |
| | | | G06Q 20/40145 |
| 2017/0177855 A1* | 6/2017 | Costa Faidella | H04L 9/3231 |
| 2017/0195124 A1* | 7/2017 | Obaidi | H04L 9/0861 |
| 2017/0255805 A1* | 9/2017 | Ebrahimi | H04L 9/3236 |
| 2017/0301052 A1* | 10/2017 | Abt, Jr. | H04L 9/3263 |
| 2018/0007060 A1* | 1/2018 | Leblang | H04L 63/107 |
| 2018/0167371 A1* | 6/2018 | Gordon | H04L 63/083 |
| 2018/0205559 A1* | 7/2018 | Bußer | H04L 9/3255 |

\* cited by examiner

SELF-AUTHENTICATING DIGITAL IDENTITY

RELATED APPLICATIONS

This application is a continuation of U.S. patent application Ser. No. 15/908,554, filed Feb. 28, 2018, which application claims priority under 35 U.S.C. § 119 to U.S. Provisional Patent Application No. 62/465,431, filed Mar. 1, 2017, the contents of which are herein incorporated by reference in their entirety.

BACKGROUND INFORMATION

Identity systems historically have been based on face-to-face interactions and on physical documents and processes. Now, however, the modern transition to a digital economy requires radically different identity systems. Indeed, in a world that is increasingly governed by digital transactions and data, existing methods for managing security and privacy are no longer adequate. Data breaches, identity theft, and large-scale fraud are becoming more common. In addition, a significant portion of the world's population lacks the necessary digital credentials to fully participate in the digital economy. As such, identity is the new frontier of privacy and security, where the very nature of entities is what allows them to complete some transactions but be denied from completing others.

To understand the importance of identity and the criticality of strong identity protocols that protect against cyber-risk, while still suiting the needs of transacting parties, it is essential to understand what identity is and its role in enabling transactions.

Whether physical or digital in nature, identity is a collection of individual information or attributes that describe an entity, and it is (or at least can be) used to determine the transactions in which the entity can rightfully participate. Identities typically are assigned to three main kinds of entities:

Individuals, the entity most associated with identity;
Legal entities, like corporations, partnerships, and trusts; and
Assets, which can be tangible, e.g., cars, buildings, smartphones, IOT devices, etc.; or intangible, e.g., patents, software, data sets, etc.

The identity for each of these entities is based (in whole or in part) on the entity's individual attributes. Attributes typically fall into three main categories:

Inherent: Attributes intrinsic to an entity and not defined by relationships to external entities. Inherent attributes for individuals include things such as age, height, date of birth, and fingerprints. For a legal entity, inherent attributes include things such as business status (e.g., C Corporation, S Corporation, Limited Liability Corporation, Limited Liability Partnership) and industry sector (e.g., retail, technology, media). For an asset, inherent attributes include things such as the nature of the asset and the asset's issuer.

Accumulated: Attributes gathered or developed over time. These attributes may change multiple times or evolve throughout an entity's lifespan. For individuals, accumulated attributes include things such as health records, job history, Facebook friend lists, and sports preferences.

Assigned: Attributes attached to an entity but not related to its intrinsic nature. These attributes can change and generally are reflective of relationships that the entity holds with other bodies. For individuals, assigned attributes may include things such as e-mail address, login IDs and passwords, telephone number, social security ID, and passport number.

Attributes enable an entity to participate in transactions by proving the entity has the specific attributes required for that particular transaction. For example, to buy alcohol, individuals must prove they are over the legal drinking age; to vote, they must prove they are over the legal voting age, are citizens, and reside in the pertinent jurisdiction. Thus, attributes and the way they are established and used are important to any well-functioning identity system.

An identity system generally includes four key roles:

Users. Entities for which the system provides identity, for the purpose of allowing them to engage in transactions.
Identity Providers. Entities that issue and/or validate User attributes, attest to their veracity, and complete identity transactions on behalf of Users.
Relying Parties. Entities that accept attestations from Identity Providers about User identity to allow Users to access their services.
Governance Body. Entities that provide oversight for the system and owns the operating standards and requirements.

Let us illustrate how an identity system works using passports as an example. Users are the individuals asked to present their passports as proof of identity to enter a country (or open a bank account, etc.); the Identity Provider is the government of the user's country issuing the passport; the Relying Party is the entity that accepts the passport based on trusting the issuer and verifying that the passport is valid and that the bearer is its true owner; the Governance Body includes international agreements among passport agencies and passport standards agreed to by the International Civil Agency Organization.

The fundamental concept and purpose of basic identity systems have not changed over time, while methods and technology have made huge strides forward. Specifically, existing digital identity systems have the same basic structure as a physical identity system, but attribute storage and exchange are entirely digital, removing reliance on physical documents and manual processes. Yet, existing identity systems still have proven inefficient, and enhancements are both necessary and desired.

Five key trends are driving the need for enhanced digital identity systems:

Increasing transaction volumes. The number of identity-dependent transactions is growing through increased use of the digital channel.
Increasing transaction complexity. Transactions increasingly involve disparate entities without previously established relationships, e.g., cross-border transactions.
Rising customer expectations. Customers expect seamless, omni-channel service delivery and will migrate to services that offer the best customer experience.
More stringent regulatory requirements. Regulators are demanding increased transparency around transactions, requiring greater accuracy and protection of sensitive identity information.
Increasing speed of financial and reputational damage. Bad actors in financial systems are increasingly sophisticated in the technology and tools they use to conduct illicit activity, thereby increasing their ability to quickly cause financial and reputational damage by exploiting weak identity systems.

Before improvements to an identity system can be made, it is helpful to better understand more about their general make-up. In general, a digital identity system consists of multiple layers, each of which serves a different purpose. These layers can include six distinct layers:

Standards—Standards must govern the overall operation to avoid consistency and coordination issues.

Attribute Collection—The necessary user attributes must be accurately captured, stored, and protected.

Authentication—Mechanisms must be provided to link users to attributes to avoid authentication errors.

Attribute Exchange—Mechanisms must be provided for exchanging attributes between different parties without compromising security and privacy.

Authorization—Proper rules and relationships must be applied to authorize what services users are entitled to access based on their attributes.

Service Delivery—Users must be provided with efficient, effective, easy-to-use services.

Some have suggested that financial institutions are well positioned to drive the creation of enhanced digital identity systems on the basis that (1) they already serve as intermediaries in many transactions, (2) they are generally trusted by consumers as safe repositories of information and assets, and (3) their operations—including the extensive use of customer data—are rigorously regulated.

Whether financial institutions or others are best suited to develop and/or operate an enhanced digital identity system, the fact is that current digital identity systems are disparate and ill suited in at least certain situations. For example, today many of the identity solutions are architected to have an authority that issues and manages the identities for their user base. Example identity issuers (or "Identify Providers" referenced above) include entities such as GOV.UK Verify (in the United Kingdom), SecureKey (in Canada), and ID.me (in the United States).

A problem with these issuers' operations is that the issuer has visibility into the personally identifiable information and activity of the user. In other words, even though the issuer may store the user data encrypted, it has control of the keys and needs to see the data to perform tasks for sharing select information with others, such as a Relying Party. Thus, when sharing such information, the identity of each party involved (User, Identify Provider, and Relying Party) may become apparent to one another.

For example, if a user is a Wells Fargo customer and uses his electronic identity (issued by Wells Fargo) to prove he is who he says he is to Bank of America in order to apply for a loan, the user may not want Bank of America to know he is a Wells Fargo customer, nor may the user want Wells Fargo to know that he is applying for a loan at Bank of America. The user just wants to prove that he is whom he says, and that a valid authority has validated his identity to be accurate. In other words, in this scenario the user wants and needs a self-authenticating digital identity. Moreover, the relying party (i.e., Bank of America in the example) may want some additional assurance or data indicative of how (or the degree to which) the user's identity was verified, especially if a self-authenticating identity is being used.

SUMMARY

The present embodiments provide a system and method for a self-authenticating identity. In one embodiment, a self-authenticating identity is a digital identity that is created by cryptographically signing the user's verified identity information and the user's public key, both of which are digitally signed by the user and the identity provider (i.e., dual signed). As such, these become cryptographically bound together to allow the user to prove that the user is in fact the true party that the identity was issued to, without the need for a third party to be directly involved or to see any of the private information.

In another embodiment, the identity may also contain information that conveys how the identity was verified. In this embodiment, the user's verified identity information includes some or all of the verification information, all of which is then digitally signed by the user and the identity provider (i.e., dual signed) as explained above. As such, a relying party that receives a user's self-authenticating identity would know how the identity was verified and the return results of that verification, thereby allowing the relying party to better verify the user's identity without further involvement by the identity provider.

These and other embodiments and aspects of the present invention are described in more detail below.

DETAILED DESCRIPTION

Figure 1:
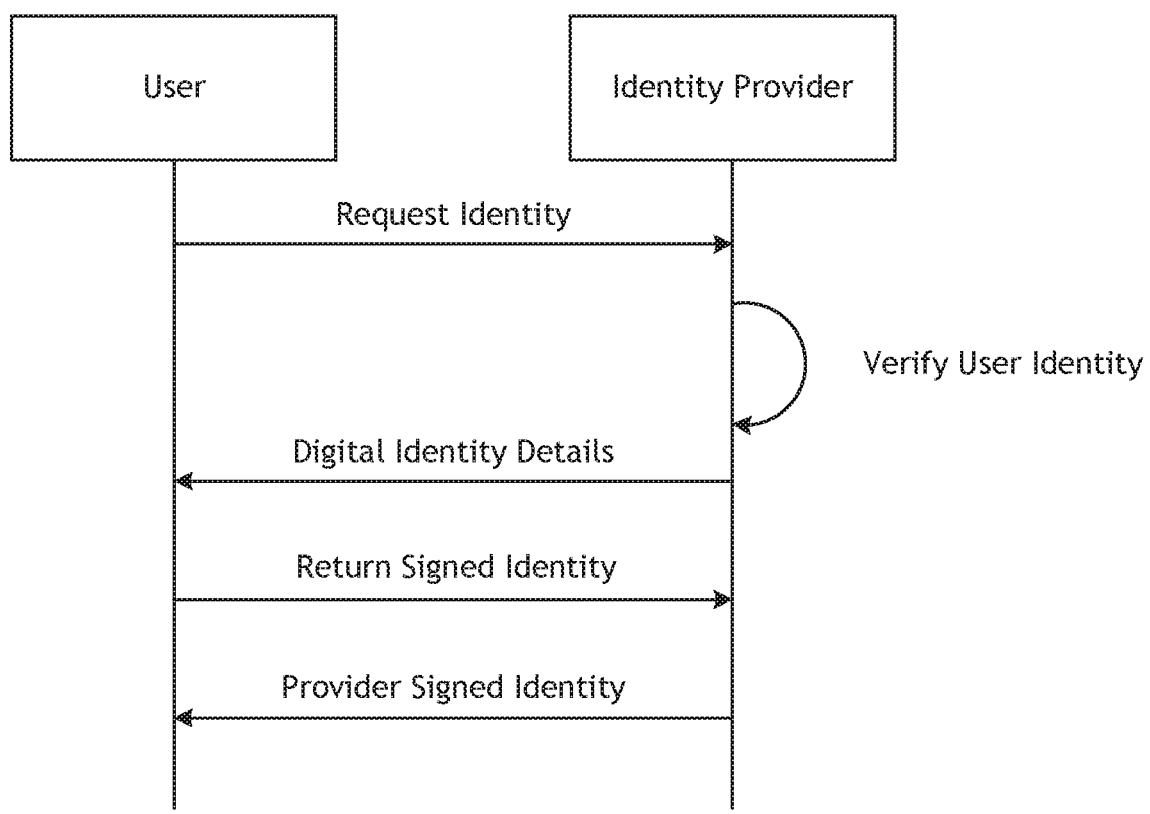
FIG. 1 is a diagram and flowchart showing certain interactions between a User and an Identity Provider.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded their widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Public key, private key cryptography is well known to those skilled in the art, and it is assumed here that a public/private key pair is generated for, or already exists for an identity recipient (or "User" as described above). One way of generating and securely storing the key pair is for the holder to use a personally controlled device and an application for that device, such as a mobile application on a smart phone. In this example, of which there are many, the keys can be stored in the mobile secure keystore. A modern electronic device, whose use and operation is enhanced by the present embodiments, includes a computer architecture employing memory, controllers, microprocessors, and buses, for supporting wired and/or wireless communications.

In one embodiment, four actors are involved and interact with a self-authenticating identity: (1) an Identity Issuer (or "Identity Provider" as described above); (2) an Identity Holder (or "User" as described above); (3) an Identity Acquirer (or "Relying Party" as described above); and (4) an Identity Broker (the service facilitating the issuance, status, and/or verification of the identity validation). As described in more detail below and with reference to FIGS. 1-3, each of these actors typically is involved in some aspect(s) of the creation and use of the self-authenticating identity.

In one embodiment and with general reference to FIG. 1, a self-authenticating identity is formed when a User approaches an Identity Provider for purposes of acquiring a self-authenticating identity. As part of the process of creating the User-requested self-authenticating identity, the Identity Provider performs verification steps necessary to issue the identity. In other words, the Identity Provider assumes the responsibility and takes the necessary steps to insure that the User is who it says it is. Examples of this verification vary depending on the nature of the situation, i.e., the criticality of ensuring the User really is who it says it is. For example, the verification process may include acquisition and/or investigation of entity attributes or other information, such as: (1) document ID verification; (2) bank access login; (3) traditional know-your-customer questions and answers; (4) requests for private information (such as employee ID number, etc.); (5) in-person interviews; and (6) any other method of identification necessary to confirm the identity of the User with the certainty that the circumstances dictate. Indeed, an Identity Provider may even employ third party services that have verification expertise or capabilities beyond those held by the Identity Provider itself. Those skilled in the art are familiar with the nuances and options available to the verification process. Likewise, those skilled in the art will appreciate that identity verification is not limited to individuals as Users, and may extend to other entities, as described above.

Once the Identity Provider has suitably verified the User's identity, the Identity Provider creates an identity assertion or set of identity assertions for the User. The identity assertion also may include additional information (in this or another embodiment) describing how the identity was verified, such as document image verification, in person interview, knowledge questions, etc. It also may contain (in this or another embodiment) the name of one or more third party services used to verify the identity and any results that were used in the identity analysis. In some cases, the identity analysis and its resulting assertion(s) may be a confidence level, as opposed to certitude about the identity of the User. The identity assertion plus (in this embodiment) the date/time of its creation then are sent to the User.

Upon receipt, the User appends (in this or another embodiment) the current time/date and its public key, and then signs the aggregated identity, public key, and date/time with its private key. This signed, aggregated identity then is sent back to the Identity Provider, who (in this or another embodiment) validates that the information is accurate, appends its public key and date/time, and signs the entire aggregated data with its private key. (Note: hashes of public keys may also be used inside the identity instead of the actual public key itself. As described in more detail below, an identity broker could provide the lookup for the actual public key based on the hashed public key.) In yet another embodiment, rather than the Identity Provider signing using its private key, signing could be done using a group or ring signature to add anonymity to the actual Identity Provider. (As described in more detail below, signing using a group or ring signature contributes to a "double blind" process that better ensures anonymity for embodiments that implement such signing.)

The Identity Provider then sends the dual signed identity to the User, who stores the identity under its control, as described above. The User also must maintain possession of the private key it used in this process in order to prove it is the actual owner during usage of this identity (as describe in more detail below).

Figure 2:
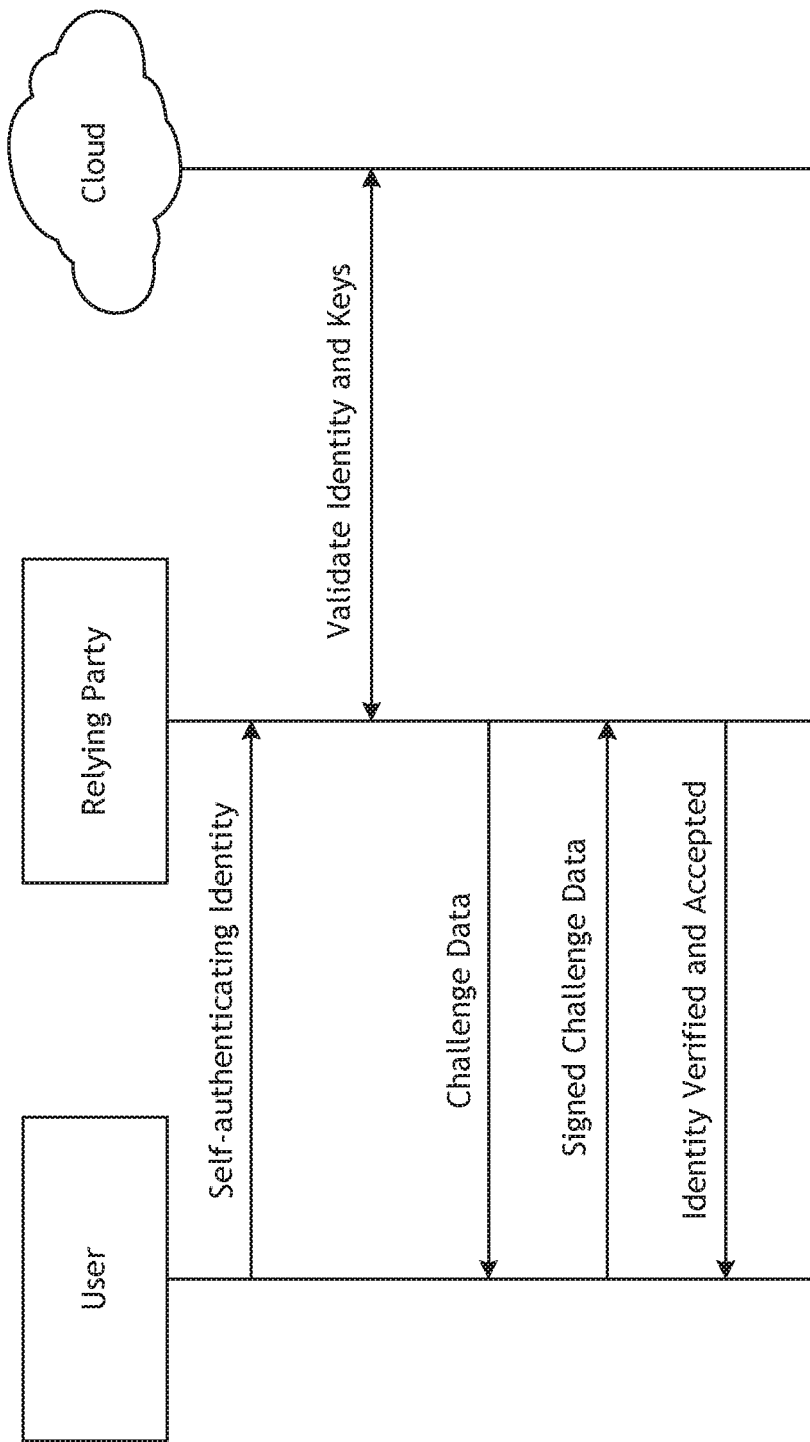
FIG. 2 is a diagram and flowchart showing certain interactions between a User and a Relying Party.
Figure 3:
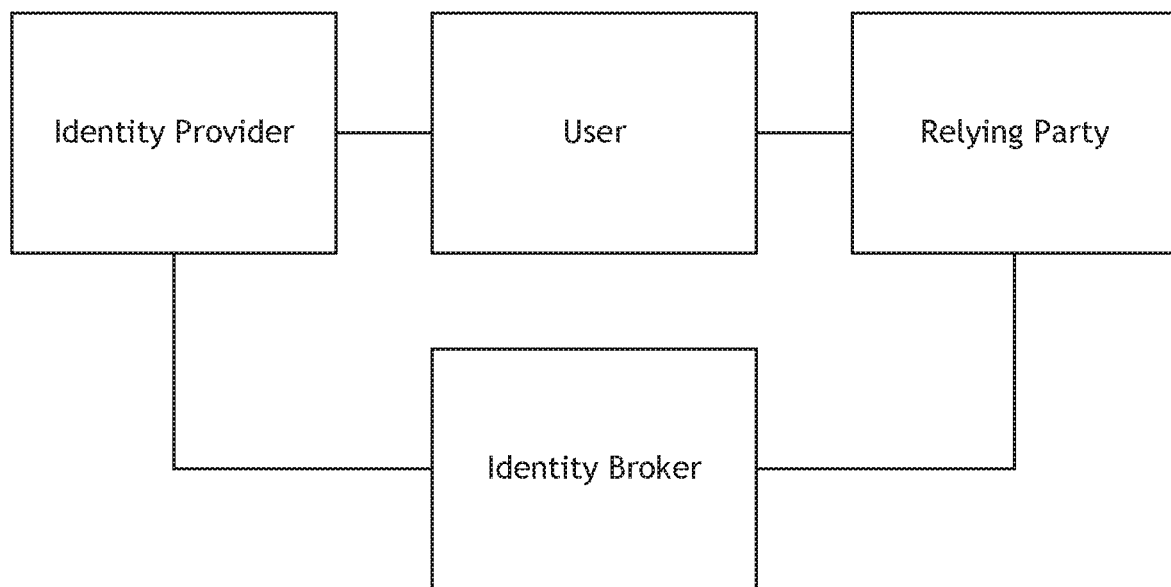
FIG. 3 is a diagram showing the relationship between a User, Identity Provider, Relying Party, and Identity Broker.

Specifically and with general reference to FIG. 2, when the User needs to verify its identity to a Relying Party, in one embodiment the User simply gives the Relying Party its (previously obtained) identity. Based on the format and content of the User's previously obtained identity, the Relying Party now can validate that the User is the actual owner of that identity by asking the User to verify that it possesses its private key. This can be done using common cryptographic challenge methods of public and private key pairs. For example, assume Party A holds a private key and Party B holds the corresponding public key, and that Party B wants to know that Party A in fact holds the particular correct private key. To do so, Party B can create a random string (sometimes called a "Nonce"), which can be anything Party B retains knowledge of. Party B sends this random string to Party A, after which Party A signs the random string with its private key and sends the result back to Party B. Party B can then use Party A's public key to check that the signature Party A returned is correct for the random string that Party B sent to Party A.

Moreover, in embodiments in which the User's identity contains verification data (as described above), the Relying Party is given further assurance regarding the validity of the identity. Accordingly, the User's identity is self-authenticating in the sense that the User has been authenticated solely via its identity, without the Relying Party having to contact or otherwise access a third party, including the Identity Provider.

In another embodiment, the Relying Party also can (further) validate the authenticity of the User's identity by validating that the Identity Provider is a trusted issuer. This can be accomplished several ways, for example (1) by confirming the issuer's public key directly with the Identity Provider or (2) using a trusted third party service (i.e., an Identity Broker) to do the same. In the second embodiment, an Identity Broker would list the public keys of trusted Identity Providers so the Relying party can be sure that the Identity Provider is a valid, trusted identity provider. Still further, in another embodiment, the Identity Broker also could offer a searchable list of revoked identities. In this case, identities could have an assigned number by issuer. When an issuer has need to revoke an identity, the issuer could inform the broker and the broker could add the revocation to its list. Thus, these embodiments offer further verification to the Relying Party regarding the authenticity of the identity, while maintaining anonymity between the Identity Provider and Relying Party. Moreover, the second embodiment ensures the "double blind" scenario mentioned above.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method of creating and applying a self-authenticating digital identity for a user having an identity, wherein the method comprises:

receiving, by an identity provider computing system, a request for the self-authenticating digital identity;

verifying, by the identity provider computing system, the identity of the user;

delivering, by the identity provider computing system based on the verifying, an identity assertion to a user computing system associated with the user;

creating, by the user computing system, a first aggregated identity assertion comprising the identity assertion received from the identity provider computing system and a public encryption key associated with the user;

digitally signing, by the user computing system, the first aggregated identity assertion with a private encryption key associated with the user;

delivering, by the user computing system, the digitally signed first aggregated identity assertion to the identity provider computing system;

validating, by the identity provider computing system, the digitally signed first aggregated identity assertion;

creating, by the identity provider computing system, a second aggregated identity assertion comprising the first aggregated identity assertion received from the user computing system, a date, and a public encryption key associated with the identity provider computing system;

digitally signing, by the identity provider computing system, the second aggregated identity assertion;

delivering, by the identity provider computing system, the digitally signed second aggregated identity assertion to the user computing system, wherein the digitally signed second aggregated identity assertion constitutes the self-authenticating digital identity;

sending, by the user computing system, the self-authenticating digital identity to a relying party computing system; and confirming, by the relying party computing system, that the identity provider computing system is a trusted issuer by using a third party identity broker service.

2. The method of claim 1, further comprising:

verifying, by the user computing system to the relying party computing system, that the user computing system possesses the private encryption key associated with the user.

3. The method of claim 2, further comprising:

evaluating, by the relying party computing system, the verifying performed by the user computing system to provide assurance regarding the validity of the self-authenticating identity.

4. The method of claim 1, wherein the confirming that the identity provider computing system is the trusted issuer comprises confirming the public key of the identity provider computing system with the third party identity broker service.

5. The method of claim 4, further comprising validating, by the relying party computing system, an authenticity of the self-authenticating identity by making an inquiry to the third party identity broker service as to whether the self-authenticating identity is still valid.

6. The method of claim 1, wherein the identity assertion includes a confidence level.

7. The method of claim 1, wherein one or more of the public encryption keys is a hashed public key.

8. The method of claim 1, wherein the second aggregated identity assertion is digitally signed with a private encryption key associated with the identity provider computing system.

9. The method of claim 1, wherein the second aggregated identity assertion is digitally signed with a group or ring signature.

* * * * *